Figure 1:
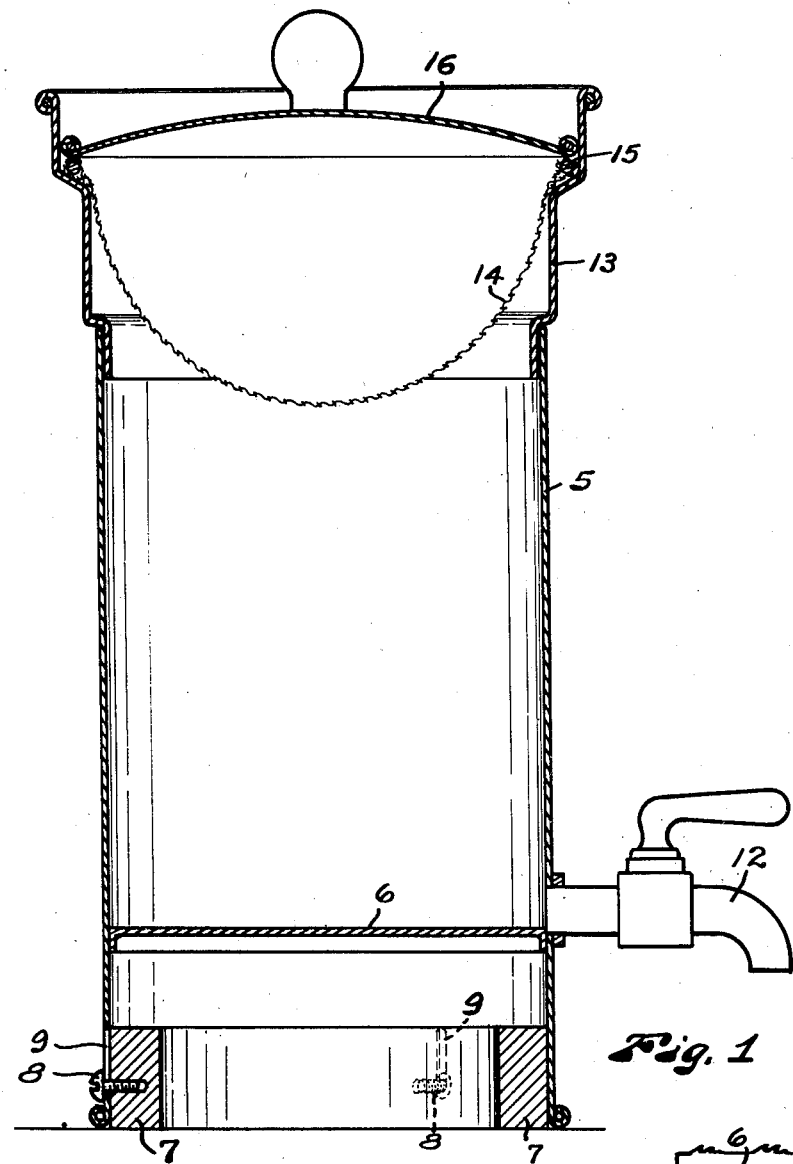

Sept. 26, 1939.   J. N. SHAW   2,174,096

COFFEE URN

Filed June 8, 1938

INVENTOR
John N Shaw
BY
G. Wright Arnold
ATTORNEY

Patented Sept. 26, 1939

2,174,096

UNITED STATES PATENT OFFICE 2,174,096

COFFEE URN

John N. Shaw, Seattle, Wash.

Application June 8, 1938, Serial No. 212,481

3 Claims. (Cl. 53—3)

This invention relates to a coffee urn or coffee making receptacle.

A primary object of this invention is to provide a coffee urn for use on a stove, which coffee urn has great stability, will not tip easily, and will not boil the coffee but will keep the coffee hot for a long period of time after it is set back or removed from the heated portions of the stove.

The invention is also applicable to other cooking utensils for liquid or materials containing a large proportion of liquid.

In dining cars and on ships and in some other places it is common practice to prepare coffee in urns or pots which are placed on stoves. In such instances the urns on the stove are liable to be subjected to various actions which tend to move the urns around on the stove and often upset these urns, resulting in spilling the coffee, damaging other foods on the stove, and sometimes inflicting painful burns on persons who are working around the stove. On dining cars this sliding and tipping of the urns may be due to quick starting and stopping, sharp curves and irregular roadbeds. On a ship such action may be due to the rolling and plunging of the ship. Also, if a coffee urn or pot has a metal bottom which is positioned so that it rests on, or substantially on, a hot stove, the coffee within the urn will be boiled and the flavor of the coffee damaged by such boiling. Also, in dining cars and on ships and in like places the stoves are sometimes small so as to occupy as little space as possible, and this may make it desirable to be able to set the coffee urn off the heated portion of the stove as soon as the coffee is made. However the coffee in the urn must be kept hot and for this reason the usual coffee urn must be kept on a portion of the stove which is warm enough to keep this coffee hot.

My invention overcomes all the difficulties hereinbefore pointed out by providing a coffee urn which has the bottom of the urn elevated above the bottom edge of the side walls of the urn far enough to avoid boiling the coffee when the urn is positioned on a hot stove, and which has a relatively heavy body or mass of heat absorbent metal positioned within the urn and below the bottom wall thereof to stabilize the urn and prevent it from tipping and sliding and to provide heat storage means for absorbing a supply of heat while the urn is on the heated portion of the stove and later giving off this heat, so as to keep the coffee hot for a long period of time after the urn is removed from the heated portion of the stove.

A further object of my invention is to provide a coffee urn having an elevated bottom and having, below said elevated bottom and within the shell of the urn, a heat storage mass of metal which is adjustable toward and away from the bottom of the urn so as to make it possible to vary the amount of heat which will be imparted to the coffee by this heat storage mass. This urn is especially well adapted for use on a stove but may be used with gas burners, electric plates and other sources of heat.

Figure 2:
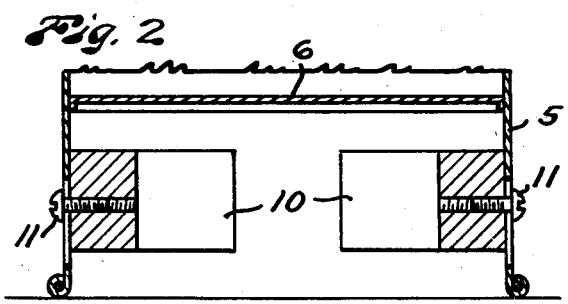
Figure 3:
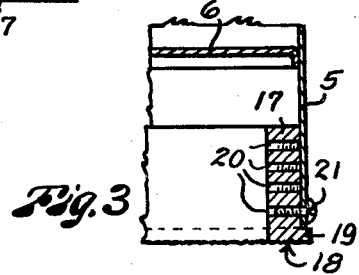

The above mentioned general objects of my invention, together with others inherent in the same, are attained by the device illustrated in the following drawing, the same being preferred exemplary forms of embodiment of my invention, throughout which drawing like reference numerals indicate like parts:

Figure 1 is a view in vertical mid-section of a coffee urn constructed in accordance with this invention; and Figs. 2 and 3 are fragmentary sectional views of two different modified forms of the invention.

Fig. 1 shows a coffee urn comprising a cylindrical shell 5 having a bottom 6 which is elevated a substantial distance above the lower end of the shell 5. When these urns are made to hold approximately one gallon, I find it satisfactory to elevate the bottom 6 approximately three inches above the lower end of the shell. Obviously this distance may be varied and the urns may be made in any desired size.

Positioned within the lower end portion of the shell 5 is a combined stabilizing and heat storage member 7. The member 7, shown in Fig. 1, is an annular ring of heavy heat absorbent metal, such as cast iron, and is slidable and adjustable within the shell 5. Screws 8 extending through slots 9 in the shell and threaded into the member 7 serve to hold said members 7 in any desired adjusted position. In Fig. 1 the bottom portion of the member 7 is shown flush with the bottom end of the shell 5 and at a maximum distance from the bottom 6 of the urn. If the member 7 is moved upwardly closer to the bottom 6 of the urn, then more of the heat which this member 7 gives off after it has been heated will be imparted to the coffee, and the coffee will be kept at a higher temperature while the member 7 is giving off its heat than it will be if the member 7 is positioned farther away from the bottom 6 of the urn. This provides a means for regulating the temperature of the coffee during the time it is being kept hot by the combined heat storage and stabilizing member 7.

The member 7 is relatively heavy and has a large central opening and said member 7 is positioned in the bottom portion of the shell at as great a distance from the central axis as possible without placing said member 7 outside of the shell. For these reasons a maximum stabilizing action is obtained from this member 7 and the urn is rendered sufficiently stable so that it will not be upset under ordinary conditions of usage on shipboard or in dining cars. Also the additional weight will help to prevent the urn from sliding around on the stove.

The bottom 6 of the urn is elevated far enough above the top of the stove on which it is placed so that the coffee in the urn will not boil under ordinary cooking conditions. The member 7 is heavy enough and low enough in the urn to obviate substantially all danger of the urn tipping over and said member 7 is capable of absorbing sufficient heat to keep the coffee hot for a substantial period of time after the urn is removed from, or set onto a cool portion of, the stove. All parts of the urn with which the coffee comes in contact are preferably made of Monel metal, stainless steel or some other metal which retains heat well and does not impart a taste to the coffee.

The structure shown in Fig. 2 is similar to the structure shown in Fig. 1 except that the combined stabilizing and heat storage means is in the form of a plurality of members 10 positioned within the lower portion of the shell 5 at a distance from the center and preferably adjustably supported by screws 11.

The urn is preferably provided with a conventional faucet 12 for drawing off the coffee. Also said urn preferably has a removable top section 13 provided with the usual fabric bag 14 secured to a metal ring 15 and adapted to contain ground coffee through which hot water may be poured to brew the coffee. A removable cover 16 is provided for the top portion 13. The top section 13 and parts associated therewith are of the usual well known construction.

In the structure shown in Fig. 3 a combined stabilizing and heat storage member 17 is positioned within the shell 5 below the bottom 6. This member 17 extends below the bottom end of the shell 5 so that it will rest on the stove or other support on which the urn is placed. The bottom portion 18 of this member 17 is preferably somewhat rough and uneven so as to offer greater resistance to sliding on the stove or other surface on which it is supported, and it has been found that this roughened surface is highly effective in minimizing slipping and sliding. The lower peripheral portion of the member 17 preferably has an external flange 19 which protects the lower end portion of the shell 5 and makes it possible to dispense with reinforcing in the bottom end portion of the shell, thus reducing the cost of the shell. The stabilizing and heat storage member 17 has a plurality of threaded holes 20 therein for the reception of screws 21 which secure the member 17 to the shell 5 and provide for limited adjustment of said member 17. Adjustment of the member 17 will vary the distance of said member 17 from the bottom 6 of the receptacle and will also vary the distance of said bottom 6 from the stove or other surface on which the urn rests. This provides an adjustment for controlling the amount of heat supplied to the bottom 6 by the member 17 and the amount of heat directly supplied to the bottom 6 by the stove. In Fig. 3 the member 17 is illustrated in its maximum elevated position.

Obviously, the members 7 and 10 shown in Figs. 1 and 2 may be arranged so as to extend below the plane of the bottom end of the shell 5 by changing the positions of the screws 8 and 11 and, if necessary, lengthening the slots through which said screws extend.

Obviously, changes may be made in the forms, dimensions and arrangement of the parts of my invention, without departing from the principle thereof, the above setting forth only preferred forms of embodiment.

I claim:

1. A cooking utensil comprising a tubular shell, the lower end of which is adapted to rest on heating means positioned external of and below the shell; a bottom wall positioned in said tubular shell at a substantial distance above the lower end of the shell whereby boiling of liquid in the compartment above said bottom wall when the utensil is placed on a heating means will be avoided; a ring shaped stabilizing weight and heat storage member of substantial bulk and weight positioned within said shell below said bottom wall, and longitudinally movable within said shell from a position adjacent the lower side of said bottom wall to a position where the lower side of said ring shaped member is adjacent the heating means, the height of said ring shaped memer being less than the distance between said bottom wall and the bottom end of said shell; and releasable means adjustably securing said stabilizing weight and heat storage member to said shell.

2. A cooking utensil comprising a shell forming side walls; a bottom wall positioned at a substantial distance above the bottom end of said shell; combined stabilizing weight means and heat storage means positioned within said shell below said bottom wall and projecting below the end of said shell and having a relatively rough bottom end portion adapted to rest on a support and provide a relatively high resistance to sliding; and adjustable means securing said combined stabilizing weight means and heat storage means to said shell providing for adjusting said combined stabilizing weight means and heat storage means toward and away from said bottom wall and for adjusting said bottom wall toward and away from the support on which the utensil rests.

3. A cooking utensil comprising a tubular shell, the lower end of which is adapted to rest on heating means positioned external of and below the shell; a bottom wall positioned in said tubular shell at a substantial distance above the lower end of the shell, whereby boiling of liquid in the compartment above said bottom wall when the utensil is placed on a heating means will be avoided; and a ring shaped stabilizing weight and heat storage member of substantial bulk and weight positioned within said shell and below said bottom wall, thereby providing substantial weight around the lower end portion of the shell for stabilizing purposes and heat storage means intermediate the heating means and the bottom wall of the utensil.

JOHN N. SHAW.